Oct. 27, 1931.　　　　　A. E. COLLINS　　　　　1,829,211
METHOD OF AND APPARATUS FOR MAKING BATHING CAPS AND SIMILAR ARTICLES
Filed Dec. 20, 1929　　　5 Sheets-Sheet 1
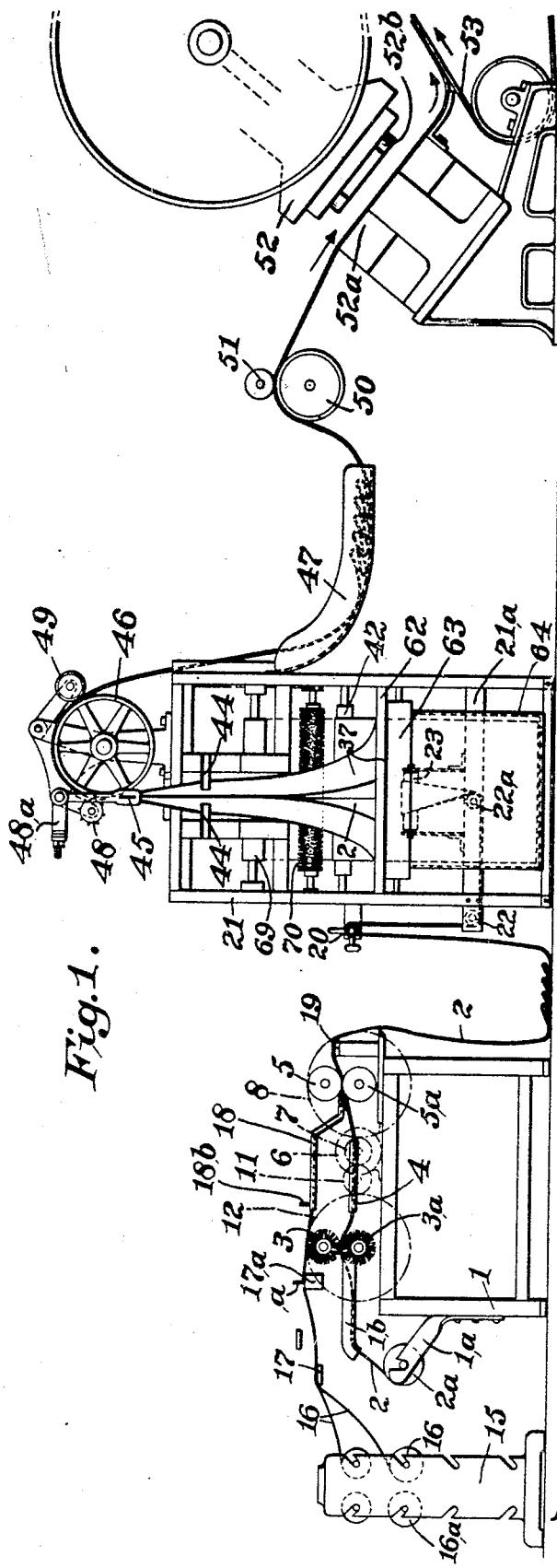
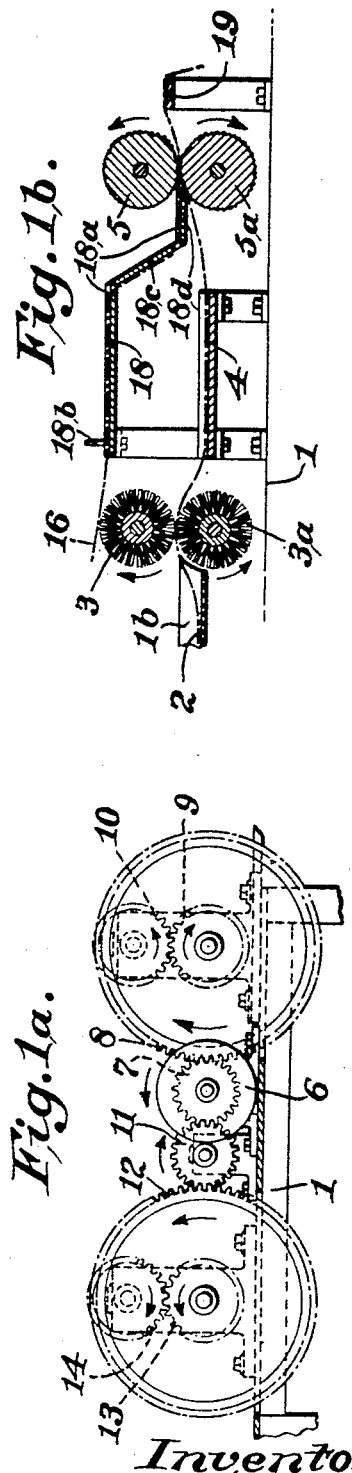
Inventor:
Arthur E. Collins,
By Fisher Middleton Donaldson Hall
Attys.

Oct. 27, 1931.  A. E. COLLINS  1,829,211
METHOD OF AND APPARATUS FOR MAKING BATHING CAPS AND SIMILAR ARTICLES
Filed Dec. 20, 1929   5 Sheets-Sheet 2
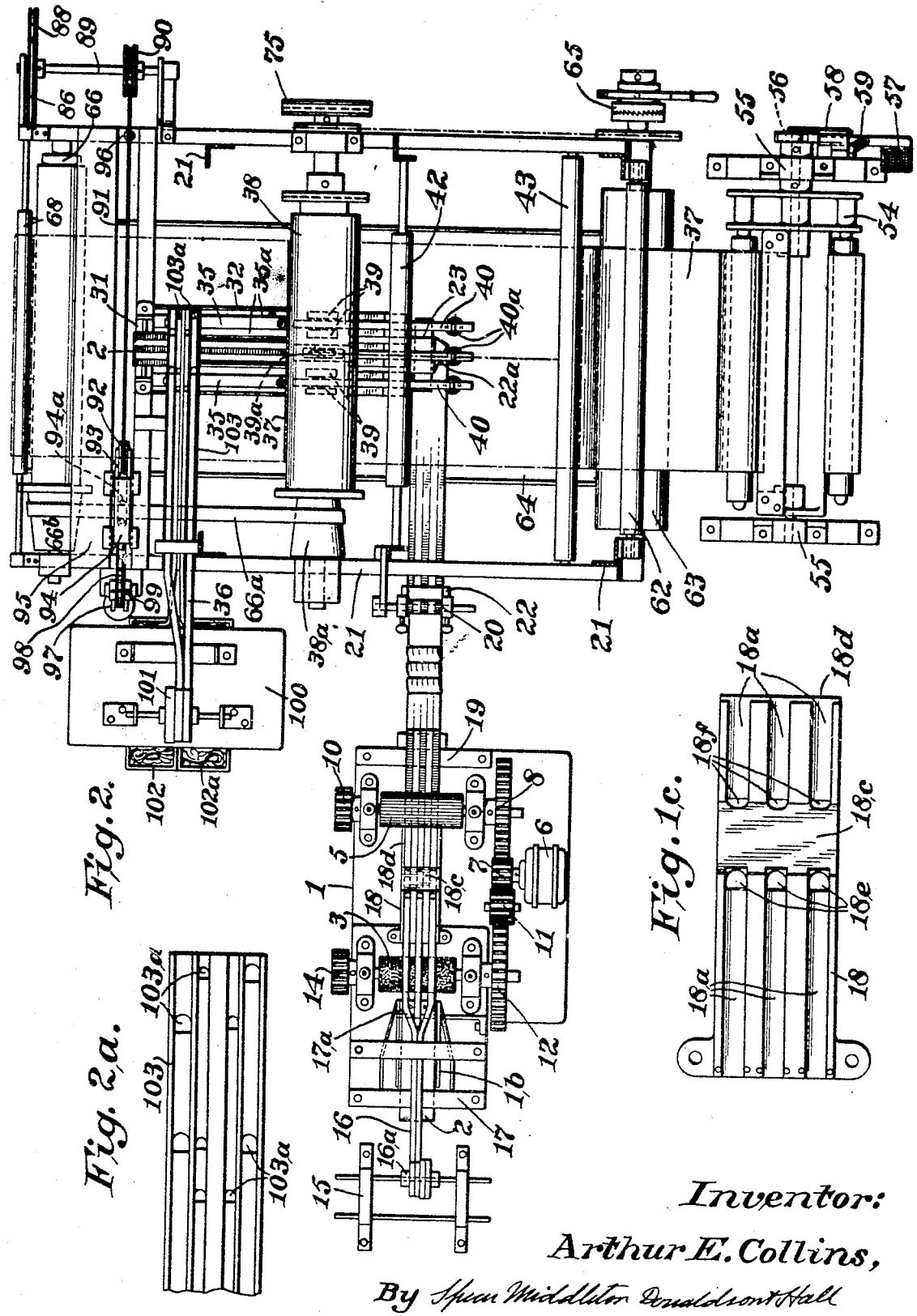
Inventor:
Arthur E. Collins,
By Spear Middleton Donaldson & Hall
Attys.

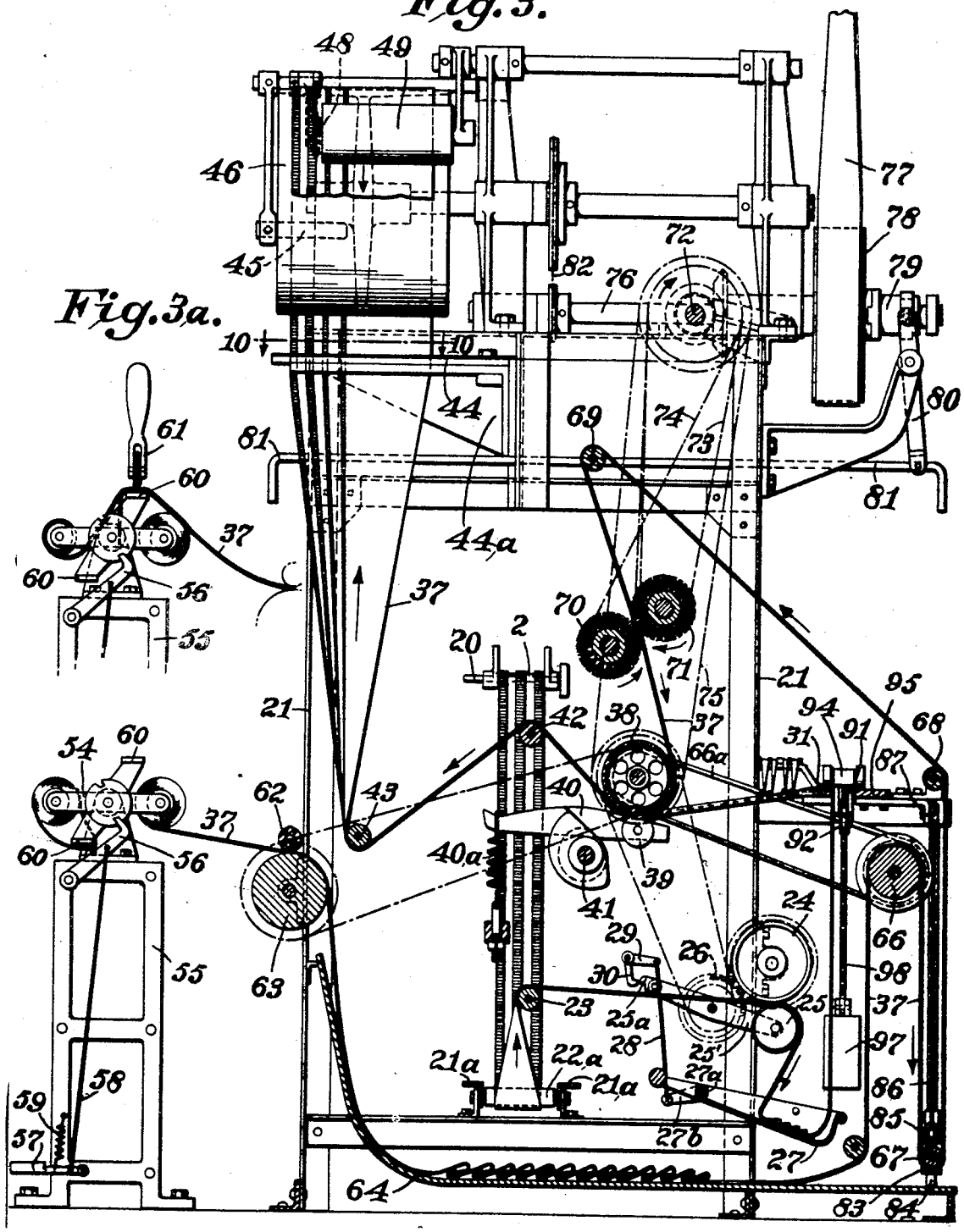
Oct. 27, 1931.    A. E. COLLINS    1,829,211
METHOD OF AND APPARATUS FOR MAKING BATHING CAPS AND SIMILAR ARTICLES
Filed Dec. 20, 1929    5 Sheets-Sheet 3
Inventor:
Arthur E. Collins,

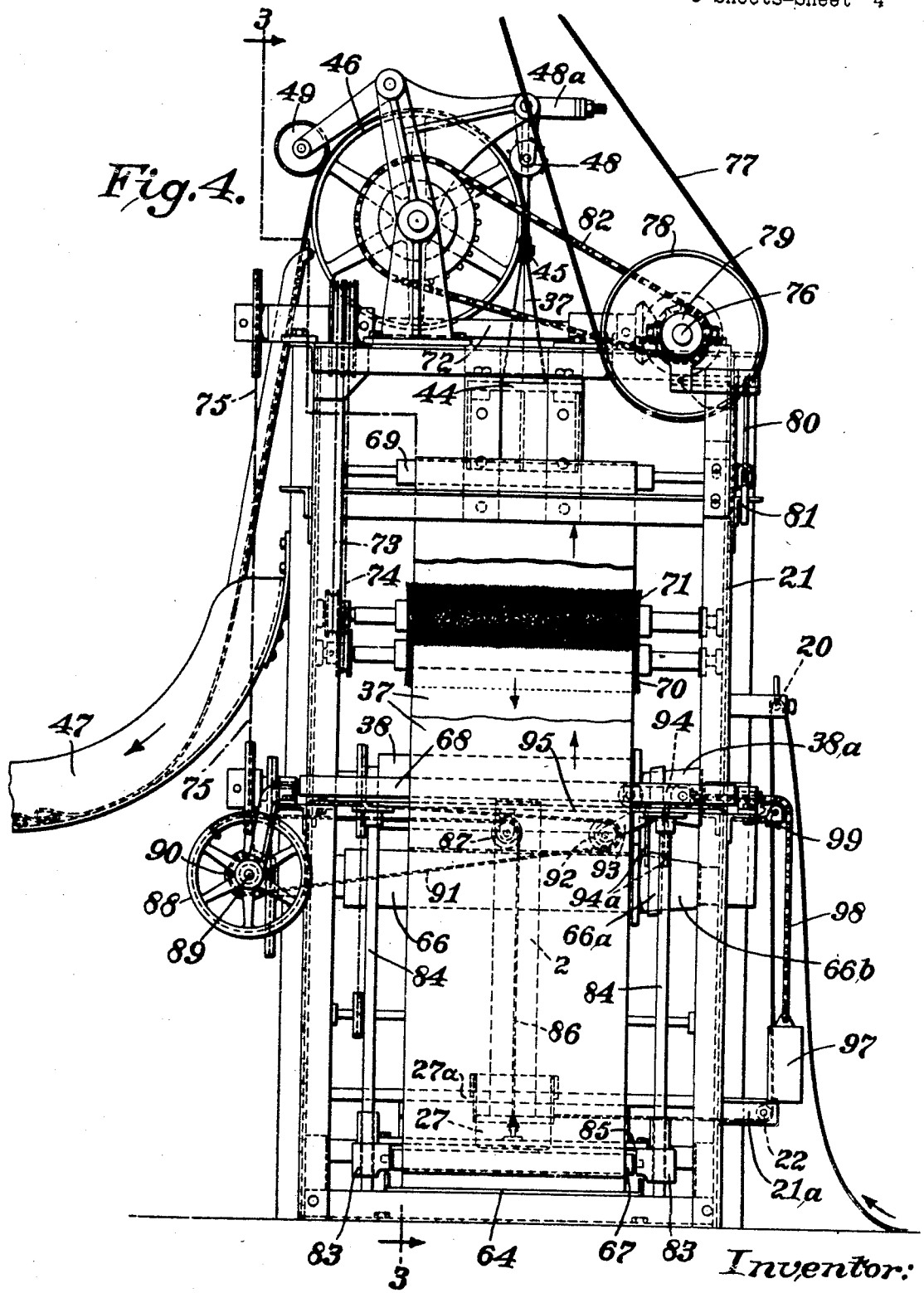

Oct. 27, 1931.   A. E. COLLINS   1,829,211
METHOD OF AND APPARATUS FOR MAKING BATHING CAPS AND SIMILAR ARTICLES
Filed Dec. 20, 1929   5 Sheets-Sheet 5
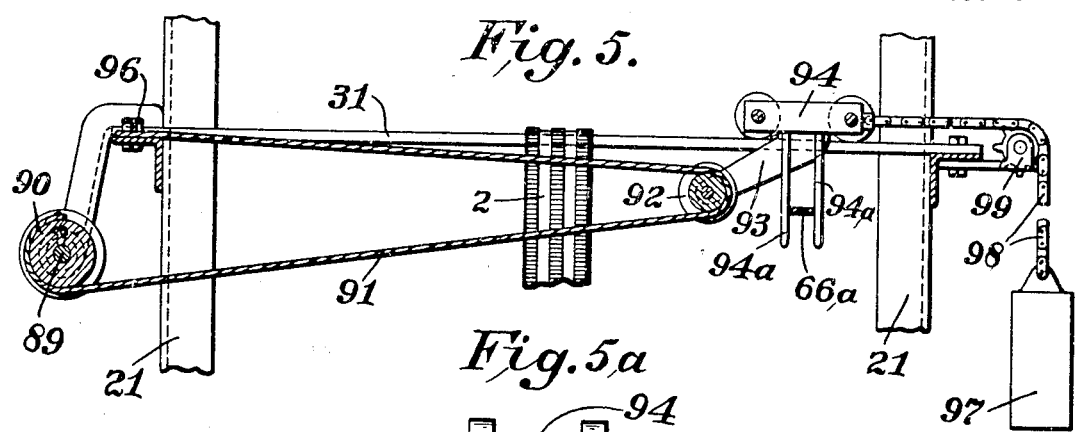
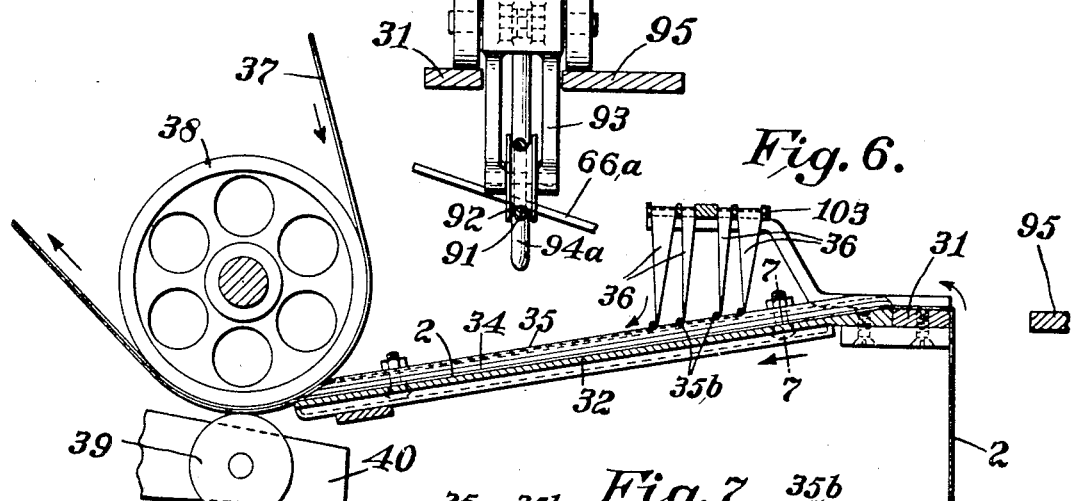
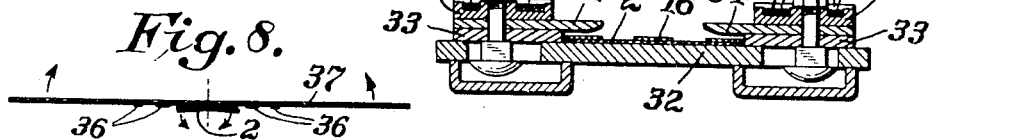
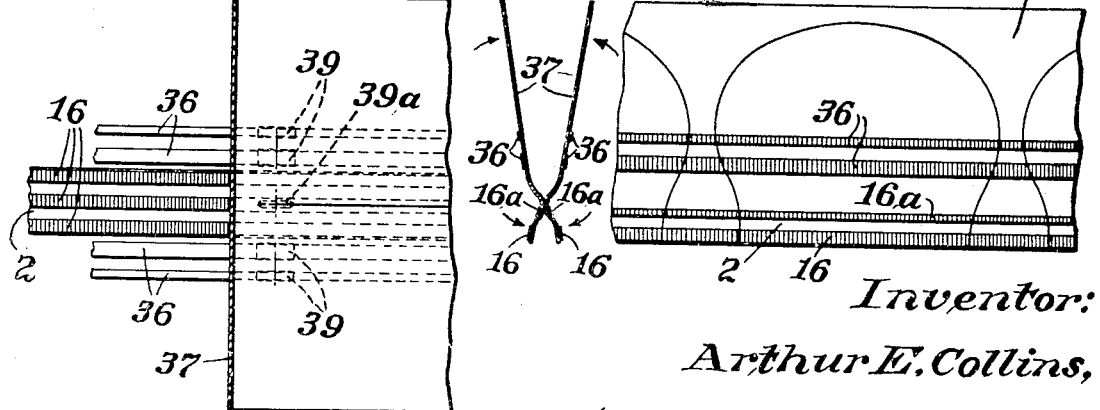
Inventor:
Arthur E. Collins,
By Spear Middleton Donaldson Hill
Attys.

Patented Oct. 27, 1931

1,829,211

UNITED STATES PATENT OFFICE

ARTHUR E. COLLINS, OF CUYAHOGA FALLS, OHIO, ASSIGNOR, BY MESNE ASSIGNMENTS, TO THE MILLER RUBBER COMPANY, INC., OF WILMINGTON, DELAWARE, A CORPORATION OF DELAWARE

METHOD OF AND APPARATUS FOR MAKING BATHING CAPS AND SIMILAR ARTICLES

Application filed December 20, 1929. Serial No. 415,544.

My said invention relates to an improved method of and apparatus for manufacturing rubber bath caps and analogous articles.

The invention aims to provide a novel method and means by which bath caps having thicker or stronger margins or head band portions may be rapidly and economically manufactured.

The invention further aims to provide a novel method and means by which such caps, so manufactured may be provided with ornamental bands on either the head band or body portions or on both.

The invention further aims to provide a method and means by which the operations referred to may be efficiently, expeditiously and economically carried out in a continuously progressive manner.

With these, and various other objects in view which will be apparent from the following description, the invention includes the novel method and apparatus hereinafter described and defined by the claims appended hereto.

In proceeding according to my improved method I apply to the central portion of a stock sheet of suitable material and color for forming the body of the cap a head band forming portion of preferably heavier or stronger texture, or if desired a different color, and this band I die seam or pinch cut, along its central longitudinal line, to the stock sheet by the use of a cutting die having a blunt edge which practically severs said assembled sheet and band along said line (leaving their edges slightly adherent) and simultaneously seams each severed edge of the band to the corresponding severed edge of the stock sheet. Thereafter the portions of the stock sheet and band on each side of said seam line are folded in opposite directions until the two portions of the stock sheet are in juxtaposition to each other and likewise the band portions, said band portions lying in the same planes as the stock sheet portions and forming integral continuations thereof.

Preferably the operations are made progressive and continuous and preferably also ornaments are applied to the band or to the body sheet, or both, before the die seaming takes place. Such ornaments preferably take the form of colored strips or ribbons of plastic material, and the body sheet and band are juxtaposed so that the ornament strips carried by the band lie between the band and body sheet while the ornament strips on the body sheet lie on each side of the band on the face of the body sheet to which the band is applied (see Fig. 5) whereby when the sheet portions are folded as above described the ornament of strips all lie on the outer faces of the composite sheets thus produced (Fig. 10).

After the composite sheet has been thus formed the cap is cut therefrom by a blunt or pinch cutting die in the manner well understood by those skilled in the art and the cap after certain desired detail operations forming the subject of application filed of even date herewith is ready for vulcanization in the customary manner.

The action of the cutting die which forms the two juxtaposed composite sheets leaves said sheets lightly adherent and to separate them I pass a separator blade therebetween while to prevent displacement of the sheets after rupture of the bond and before cutting the cap or caps therefrom I cause them to be temporarily welded or joined at a plurality of isolated points.

The preferred apparatus for carrying out my improved method is illustrated in the accompanying drawings in which:

Figure 1 is a side elevation, largely of a schematic or diagrammatic nature illustrating novel apparatus for carrying out my improved method.

Figure 1ᵃ is an enlarged detail view of the roller and brush drive for the cooperating with the sheets as they come from the supply rolls at the left of Figure 1.

Figure 1ᵇ is an enlarged sectional detail of the brushes, feed rolls and intermediate sheet guides.

Figure 1ᶜ is a detail plan view of the ornament strip guide shown in section in Figure 1ᵇ.

Figure 2 is a plan view of the apparatus shown in Figure 1 with the die press and feed means thereto omitted.

Figure 2ª is a plan view of the preliminary guide for feeding the ornamental strips for the upper part of the main body of the cap.

Figure 3 is a transverse vertical section on substantially line 3—3 of Figure 4.

Figure 3ª is a detail of the sheet joining means.

Figure 4 is an enlarged detail side elevation of the portion of the apparatus shown at the center of Figure 1.

Figure 5 is a detail view of sheet feed regulating means.

Figure 5ª is a detail view thereof.

Figure 6 is an enlarged detail view partly in section of the means for associating the band, body sheet and pinch cutting the same on the median line thereof, the section being taken substantially on the line of the pinch cutter.

Figure 7 is a section on line 7—7 of Figure 6.

Figure 8 is a cross section of the assembled cap forming and ornamenting sheets or strips prior to folding.

Figure 9 is a schematic view of the sheet and strips of Figure 1 with the strips projected beyond the sectional edge of the sheet for illustrative purposes.

Figure 10 is a section through the sheets substantially on line 10—10 of Figure 3 and Figure 11 is a plan view of the folded sheet with the caps died therefrom but not removed.

Referring by reference characters to these drawings the numeral 1 designates a supporting frame having brackets 1ª for supporting a stockroll 2ª upon which the band stock sheet 2 is wound which provides the sheet material for the head band portion of the cap. This sheet is lead over a guide 1ᵇ and thence between brushes 3 and 3ª which contact with the upper and lower faces of the sheet and have their contacting portions moving in a direction reverse to the travel of the sheet to remove the surplus non-stick powder with which sheets are dusted prior to being wound in rolls.

After leaving the brushes the sheet passes along a supporting guide 4 to the bight of upper and lower feed rolls 5 and 5ª which have their surfaces preferably milled as shown in Figure 1ᵇ.

The feed rolls and brushes are driven in the proper directions (illustrated by the arrows Fig. 1ᵇ) by an electric motor 6 (Figs. 1ª and 2). The shaft of the motor carries a pinion 7 which meshes with a pinion 8 fast on the shaft of roll 5ª, roll 5ᵇ being driven from roll 5ª by intermeshing gears 9 and 10 at the opposite ends of said rolls.

Said motor shaft pinion 7 also meshes with an idle pinion 11 which in turn meshes with a gear or pinion 12 fast on the shaft of the lower brush 3ª, while the shaft of the upper brush 3 is driven from the lower brush by the intermeshing gears 13 and 14 fast on said shafts at the opposite end.

Adjacent the stand 1 is located a roll support 15 having a plurality of pairs of inclined slots to removably support the spindles of a plurality of spools 16ª for supplying the colored ornament ribbons, strips or tapes 16, said support having slots on opposite sides for holding active and reserve spools.

From the active spools the ribbons are lead over one or more guide bars 17 and 17ª the latter having upstanding guide pins a, and thence the ribbons pass to the channels 18ª of a guide plate 18 suitably secured to the support 1, said guide plate having upstanding pins 18ᵇ adjacent the anterior ends of said channels. In their passage from guide bar 17 to the anterior end of guide 18 the ribbons contact on their under sides with brush 3 as shown in Figures 1, 1ᵇ and 2.

The guide plate 18 has a downwardly inclined portion 18ᶜ leading to a horizontal portion 18ᵈ in substantial alinement with or adjacent the bight of rolls 5, 5ª said horizontal portion being likewise provided with ribbon receiving channels 18ª in its upper face.

Ribbon passage openings 18ᵉ and 18ᶠ are provided at the top and bottom of said inclined portion 18ᶜ and the ribbons are lead through the upper openings, down the back of the inclined portion and through openings 18ᶠ into the channels 18ª of the lower portion 18ᵈ.

The head band strip 2 passes to the bight of the feed rolls beneath the portion 18ᵈ and has superposed on it as it passes into the bight of the rolls the ribbons 16 as they issue from the guide channels of the portion 18ᵈ, and the pressure of the rolls welds the ribbon to the surface of the band. After leaving the said rolls the compound or ornamented band passes over a horizontal guide bar 19 and drops in a slack loop formation onto the floor or any other suitable support prior to passing to the subsequent mechanism now to be described and as illustrated in Figure 1.

From this slack the ornamented band is led over an idle roller 20 supported by brackets from a main frame 21 and thence down and horizontally beneath rollers 22 and 22ª carried by bars 21ª supported by the main frame (see Fig. 3).

From roller 22ª the band passes upward over guide roller 23 which gives it a quarter turn and thence it is led between feed rolls 24 and 25 which are arranged to give it a variable feed.

For this purpose roll 24 is positively driven at constant speed by gearing as shown in Figure 3 and its periphery is eccentric to its axis while roll 25 is an idle roll carried by rocking frame 25' mounted to fulcrum about the axis of gear 26 which drives eccentric roll 24.

The frame 25' is so balanced or counterweighted that roll 25 is normally pressed upward into contact with the eccentric roll and in the absence of any other means would result in a constant feed. To vary the feed I provide the following means comprising a pivoted tray 27 mounted to fulcrum about pivoted axis 27ª and which tray is arranged to receive the band in slack form as it passes over floating roll 25. Said tray is counterweighted so as to normally be held elevated but to be depressed by the accumulation of a certain amount of slack therein as indicated in Figure 3. When so depressed an arm 27ᵇ fast on the tray through link 28 and lever arm 29 swings pawl 30 into position to engage a finger 25ª on the end of lever frame 25'. The result of this is that as the floating roll is moved downward by the eccentric roll the pawl or dog will engage said finger and prevent the return of the floating roll whereby the floating roll will contact with the eccentric roll through only a portion of the cycle of rotation of the latter and the feed of the band will be decreased. This continues until the lessened weight of the band accumulation in the tray allows the latter to rise, which disengages the dog and allows the floating roll to rise and resume the normal feed.

From the tray 27 the band is led upward over horizontal bar 31 to the point where it is assembled with the body sheet and ornamental strips or ribbons therefor as will now be described.

After passing over the bar 31 the band with its ornament ribbons or strips uppermost is conducted along an elongated table like support 32 preferably downwardly inclined (see Figs. 6 and 7) which support has marginal guide strips or bars 33 and plates 34 which overhang the side edges of the band and the ornament tapes carried thereby as shown in Figure 7. Superimposed on these plates 34 are supporting and guiding members 35 having guide channels 35ª for the body ornament tapes or ribbons 36 which are, by means of suitable feeding and guiding means hereinafter described led to the channels 35ª by which they are conducted and guided to the point where they are applied to the underside of the body sheet 37 as it passes around the roll 38, said ribbons being pressed into adhering contact with the body sheet by rollers 39 carried by rocking levers 40 fulcrumed on shaft 41, the rollers being pressed upward by springs 40ª adjustably at their opposite ends to a fixed cross bar (see Fig. 3). The band support or guide 32, like the guide channels 35ª terminates beneath the roll 38 so that the band 2 with its ornament ribbons 16 uppermost is brought into juxtaposition to the under face of the traveling body sheet as is passes around said roll 38 though not pressed into adhering contact therewith except at the median line thereof as hereinafter described.

The guides 33 for the side edges of the band 2 are made adjustable laterally by the bolt and slot connection shown in Figure 7 for accommodating various widths of bands, and to accommodate different widths of ornament ribbons 36 the guides 35 may be removed by unscrewing the holding nuts and replaced by guides having channels of different width.

In Figure 7 each guide 35 is shown as having one narrow and one wide guide for applying relatively wide and narrow ribbons, the same result being secured in connection with the band ornament ribbons 16 by proper selection of ribbon spools.

It will be understood that the body sheet is fed continuously at a rate of speed uniform with that of the band and ribbons by means hereinafter described and that the band and ribbons are assembled progressively during such feed.

As the band passes under the roll 38 and into juxtaposition to the under face of the body sheet its median line portion passes between said sheet and a rotary seaming cutter disk 39ª rotatably carried by a lever 40 identical to those provided for rolls 39 and it will be noticed from Figures 2 and 9 that this seaming cutter has its edge contacting with the centrally located one of the three ribbons 16.

This seaming cutter severs the central ribbon 16, band 2 and body sheet 37 along the median line thereof, (the roll 38 forming a platen for the action of the knife) and simultaneously joins or welds the severed edges of the band to the body sheet, in the manner well understood by those skilled in the art, the central ribbon 16 being thereby divided into two ribbons which form the upper ornament ribbons for the head band portion of the cap as indicated at 16ª in Figures 10 and 11. While the pinch cutter 39ª severs the assembly as aforesaid the severed edges, due to the tacky nature of the material adhere lightly to each other.

After leaving platen roll 38 the sheet assembly passes over guide roll 42 and under guide roll 43 and thence upward through a folding template 44 supported on a bracket 44ª carried by the main frame, by which the sheet and band portions are folded in respectively opposite directions, the directions of fold being indicated by the curved arrows in Figures 8 and 10 whereby is produced a stock blank composed of two sheets non-adherent except at the line of pinch cut, each sheet comprising a cap body forming part and a head band part bearing ornament ribbons on their outer faces ready to have the caps cut therefrom as indicated in Figure 11. The sheet portions are separated whereby adherent along th line of the pinch cut by a knife blade 45 projecting therebetween and supported as shown in Figure 3. After leaving the knife blade the sheet assembly passes over driven roll 46 and thence to slack receiver 47 where it gathers in the shape of a plurality of slack loops or pleats Figures 1 and 4, preparatory to its being fed to the cap cutting die shown on the right of Figure 1 and hereinafter to be more specifically described.

To prevent any relative displacement of misalinement of the sheets after separation by the knife I provide an idle roll 48 lightly pressed towards the roll 46 by weight 48ª which roll 48 has a plurality of pricking points or pins clearly shown in Figure 4. These temporarily tack the sheets together at a plurality of isolated points and prevent any accidental relative displacement. I also provide a floating or gravity actuated presser roll 49 bearing on the sheet assembly after leaving roll 48.

The sheet assembly is drawn from the receiving pan 47 by feed rolls 50—51 and delivered to a punch press of ordinary type indicated conventionally at 52 on the right of Figure 1 as aforesaid said punch press having its platen 52ª preferably arranged at an angle as shown and having a reciprocating pinch cutting die 52ᵇ of the shape of the cap to be formed as shown by the curved lines of Figure 11, which shows the cap sheet as it appears after leaving the cutter mechanism.

Said pinch cutting die 52ᵇ severs the cap from the sheet and simultaneously unites the edges of the severed portions to each other. The cap however remains lightly adherent to the remaining sheet portions by reason of the tacky nature of the material and passes therewith from the cutting press to an endless conveyor 53 by which it is conveyed to a point convenient to operators who separate the caps from the waste portions, open out the caps to separate the sides at the points where they were tacked together, and send them on for further operations, and to the vulcanizers where they are vulcanized in the manner well known to the trade.

In order to follow through the sequence of operations with a minimum of interruptions or digressions I have heretofore refrained from describing in detail the manner of supplying or feeding the body sheet and the ornament ribbons therefor prior to reaching the point of assembly with the band and these will now be described.

The body sheet 37 is supplied from spools or rolls carried by a roll carrier 54 having oppositely extending arms designed to support two rolls or spools as shown in Figures 2, 3 and 3ª, said roll carrier being rotatably mounted on a stand 55 or similar suitable support and being normally locked against movement with the arm in horizontal position by a locking dog 56 engaging a notched disk rigidly connected to the spool frame or th shaft thereof, said dog being arranged to b disengaged from the notch in the disk b the action of treadle lever 57 connected to th dog by rod 58 and normally held elevated b spring 59. Rigidly secured to the roll suppo or carrier 54 and lying on opposite side thereof are cutter bars 60 forming platen for cooperation with a pinch cutting roller c the hand tool type indica ed at 61 Figure 3

Assuming the roll carrier to be in the pos tion shown in Figure 3 with a roll on th right delivering the body sheet to the m chine, and a reserve roll on the left, the fee would continue until the active roll wa nearly exhausted. Thereupon the operato would press the treadle to release the do and rotate the roll carrier in an anticlocl wise direction which would carry the activ or right hand roll of Figure 1 to the positio shown in Figure 3ª and simultaneously th left hand roll Figure 1 to the position c right hand roll Figure 3ª. This movemer would superimpose the posterior end of th sheet on the anterior end of the sheet of th reserve roll now lying across the upper fac of the platen bar 60. By passing the pinc cutter along the platen bar as shown in Fi ure 3ª the two sheets are seamed togeth to provide continuous feed and the exhauste roll may be removed and replaced by a fres roll.

The body sheet 37 is drawn from the sup ply roll by feed rolls 62 and 63, the latt of which is driven by chain and sprock gearing (indicated by dotted lines Figur 2 and 3) from the shaft of roll 38 heretofo described the sheet being delivered to a r ceiving pan 64 where it accumulates in slac form and from which it is drawn and fe to the roll 38 as hereinafter described.

In order to stop the feed or rolls 62—( when the supply roll is to be replaced above described a hand operated clutch ( is interposed between the drive gear an shaft of roll 63 as shown at the right ( Figure 2. From the pan or tray 64 th sheet passes over a roll 66 driven by mea such as belt 66ª from the shaft of roll 38 ar thence down and around a floating roll ( Figure 3, and thence up and over guide rol 68 and 69. From this latter roll it pass down between brushes 70 and 71 which co tact with opposite faces of the sheet to r move surplus powder therefrom.

Said brushes have their contacting p ripheries moving in a direction opposed that of the sheet, this being effected by dri ing them from shaft 72 by means of be gearing 73, 74 one of the belts being cross to secure proper relative movement of t brushes, said belts being indicated by dott lines.

Roll 38 is likewise driven from shaft by chain 75 and shaft 72 is driven from tl main shaft 76 by bevel gearing indicated by dotted lines, said main shaft receiving its power from any suitable prime mover as for example by belt 77 passing around pulley 78 clutched to the shaft by clutch 79 operated by clutch lever 80 and shift rod 81 provided with handles at opposite sides of the machine by means of which the apparatus may be conveniently stopped when desired.

Roll 46 hereinbefore referred to is driven from shaft 76 by chain gearing indicated at 82.

The floating roll 67 hereinbefore referred to is designed to secure proper tension on or feed for the sheet. For this purpose it is journaled in vertically slidable members 83 guided by rods 84 and connected by cross bar 85.

One end of a flexible element 86 is connected to this cross bar from which point it passes upward over pulley 87 and thence laterally to winding and unwinding sheave or drum 88 to which its other end is fast. Drum 88 is fast on a shaft 89 which also has fast thereon a winding sheave 90 (Fig. 5) to which is attached one end of a cable or flexible element 91, the attachment being in reverse order to that of flexible element 86, i. e., the arrangement being such that when one winds the other unwinds and vice versa.

From the winding sheave or drum 90 the cable passes around an idle pulley 92 journaled in a bracket 93 depending from a roller carriage 94 traveling on tracks 31—95, the other end of the cable being fast to a fixed part of the main frame as indicated at 96.

Carriage 94 is urged normally toward the right Figure 5 by a weight 97 connected to the carriage by a flexible element such as sprocket chain 98 passing over idle sprocket wheel 99 journaled on a bracket carried by the main frame, and said carriage carries belt shifter fingers 94a which act in conjunction with the belt 66a hereinbefore described. This belt passes around reversely arranged cone pulleys 38a and 66b fast respectively on the shafts of rolls 38 and 66. From the foregoing description it will be seen that if the feed of roll 66 is too fast relative to the demands of roll 38 floating roller 67 will be lowered which through cable 86 will rotate sheave 88 in a direction to unwind the cable therefrom. This will simultaneously cause cable 91 to be wound upon sheave 90 which will move carriage 94 to the left Figure 5 against the resistance of weight 97. This will shift the belt on the cone pulleys and slow down roller 66. If the feed is too slow the reverse operation will take place. By this arrangement the feed effected by roller 66 is automatically regulated, while at the same time a constantly uniform tension on the sheet is maintained by the floating roller.

For supplying the body ornamenting ribbons 36 I provide the following means.

On a suitable stand or support adjacent the main frame 100 I provide supply spools 101, from on which the wider ribbons are carried, while the narrower ribbons I prefer to supply from trays 102 and 102a in which they are loosely arranged and from which they can be readily drawn, the ribbons passing from their respective sources to a horizontal guide 103 shown in detail in Figure 2a and in its relation to the other parts of the apparatus in Figures 2 and 6. This guide has lengthwise channels in its upper surface into which the ribbons are conducted and openings 103a in the bottom of said channels through which the ribbons pass, such openings being positioned so as to be directly above the corresponding channels 35a in the guide members 35.

After passing through these openings, the ribbons are conducted under pins 35b overlying the channels 35a by which the ribbons are given the necessary quarter turn and deposited flatwise in the channels 35a.

While in the foregoing description I have described my invention in connection with the manufacture of bath caps it will be understood that I do not limit myself to this specific article which is selected by way of example only.

Having thus described my invention, what I claim is:

1. The hereindescribed continuous method of making bathing caps and the like articles which comprises progressively applying ornaments to a moving plastic band, progressively applying said band to a plastic body sheet while the sheet is advanced, simultaneously pinch cutting said band to said stock sheet along the central longitudinal line of said band, folding the margins of the band and body sheet into opposite directions to form two juxtaposed sheets, and pinch cutting the articles from the juxtaposed sheets thus formed during the advancing movement.

2. The hereindescribed continuous method of making bathing caps and like articles which comprises progressively applying a band of plastic material to the central portion of an advancing plastic body sheet, progressively pinch cutting said sheets along the median longitudinal line thereof, progressively folding the portions of said body sheet on each side of said line into juxtaposition to each other, and the corresponding portions of the band into juxtaposition to each other and into planes forming continuations of the planes of said body sheet portions thereby forming two juxtaposed composite sheets, progressively completing the separation of said composite sheets from each other along the line of juncture thereof, and pinch cutting the articles from said composite sheets during the advancing movement.

3. The hereindescribed continuous method of making bathing caps and like articles which comprises progressively applying a band of plastic material to the central portion of an advancing plastic body sheet, simultaneously and progressively pinch cutting said sheets along the median longitudinal line thereof, progressively folding the portions of said body sheet on each side of said line into juxtaposition to each other and into planes forming continuations of the planes of said body sheet portions, thereby forming two juxtaposed composite sheets, progressively completing the separation of said composite sheets along the line of juncture, temporarily welding said sheets at isolated points to maintain alinement thereof, and cutting the articles from said composite sheets during the advancing movement.

4. The hereindescribed continuous method of making bathing caps and similar articles comprising progressively applying ornament strips to an advancing band of plastic material, progressively juxtaposing such band to the central portion of a plastic body sheet with the ornament strips facing the body sheet, simultaneously pinch cutting the juxtaposed stock sheet and band along the median longitudinal line of said band, and progressively folding the portions of the stock sheet and band on each side of said line in opposite directions into juxtaposition to each other during the advancing movement.

5. The hereindescribed continuous method of making bathing caps and similar articles comprising progressively applying ornaments to a band of plastic material, progressively applying ornaments to the margins of an advancing body sheet wider than said band, progressively juxtaposing said band to the ornamented face of said body sheet between the ornaments thereof and with the ornamented face of the band facing said body sheet, simultaneously pinch cutting said body sheet and band along the median longitudinal line thereof, and progressively folding the portions of the body sheet and band on each side of said line into juxtaposition with each other during the advancing movement.

6. The hereindescribed continuous method of making bathing caps and analogous articles which consists in progressively applying ornaments to a band of plastic material, progressively applying ornaments to the marginal portions of an advancing body sheet of plastic material of greater width than said band, progressively juxtaposing said band to the ornamented face of said body sheet between the ornamented margins thereof and with the ornamented face of the band adjacent the body sheet, simultaneously pinch cutting said band and body sheet on opposite sides of said median line into juxtaposition to each other and the portions of the band on opposite sides of said line into juxtaposition to form two juxtaposed sheets, each composed of a part of the body sheet and a part of the band, progressively rupturing the bond between the sheets thus formed; temporarily welding the sheets together, and pinch cutting the caps from the sheets during the advancing movement.

7. The hereindescribed continuous method of making bathing caps and analogous articles which consists in progressively applying ornaments to a band of plastic material, progressively applying ornaments to the marginal portion of an advancing body sheet of plastic material of greater width than said band, progressively juxtaposing said band to the ornamented face of said body sheet between the ornamented margins thereof and with the ornamented face of the band adjacent the body sheet, simultaneously pinch cutting said band and body sheet along the median line thereof, progressively folding the portions of the body sheet on opposite sides of said median line into juxtaposition to each other and the portions of the band on opposite sides of each other into juxtaposition to form two juxtaposed sheets each composed of a part of the body sheet and a part of the band, progressively rupturing the bond between the sheets thus formed, and cutting the caps from said sheets during the advancing movement.

8. The hereindescribed continuous method of making bathing caps and analogous articles which consists in progressively applying ornaments to a band of plastic material, progressively applying ornaments to the marginal portion of an advancing body sheet of plastic material of greater width than said band, progressively juxtaposing said band to the ornamented face of said body sheet between the ornamented margins thereof and with the ornamented face of the band adjacent the body sheet, simultaneously pinch cutting said band and body sheet along the median line thereof, progressively folding the portions of the body sheet on opposite sides of said median line into juxtaposition to each other and the portions of the band on opposite sides of each other into juxtaposition to form two juxtaposed sheets each composed of a part of the body sheet and a part of the band, progressively rupturing the bond between the sheets thus formed, temporarily welding the sheets together at isolated points, and pinch cutting the caps from the sheets during the advancing movement.

9. An apparatus for use in making bathing caps and similar articles which comprises means for progressively applying a band of plastic material to the central portion of a wider body sheet, means for progressively severing said sheets along the central longitudinal line thereof and simultaneously joining the severed edges of the band to the corresponding severed edges of the body sheet, and means for progressively folding the portions of the severed body sheet into juxtaposition in one direction and the corresponding portions of the band into juxtaposition in the opposite direction to form two composite juxtaposed sheets, and means for passing between said composite sheets to effect separation of the seam line.

10. Apparatus for use in making bathing caps and similar articles which comprises means for progressively applying a band of plastic material to the central portion of a wider body sheet, means for progressively severing said sheets along the central longitudinal line thereof and simultaneously joining the severed edges of the band to the corresponding severed edges of the body sheet, means for progressively folding the portions of the severed stock sheet into juxtaposition in one direction and the corresponding portions of the band into juxtaposition in the opposite direction to form two composite juxtaposed sheets, and means for temporarily welding said sheets at a plurality of isolated points.

11. Apparatus for use in making bathing caps and similar articles comprising means for progressively applying a band of plastic material to a traveling plastic sheet, means for continuously feeding said assembled band and sheet, pinch cutting means arranged to act on said band and sheet on the median line thereof during such feed, means acting posterior to said cutting means for progressively folding the portions of the sheet and band on each side of the line of cut into juxtaposition in opposite directions, and a stationary sheet separating blade projecting between the sheets and across the line of said cut.

12. Apparatus for use in making bathing caps and similar articles comprising means for progressively applying a band of plastic material to a traveling plastic sheet, means for continuously feeding said assembled band and sheet, pinch cutting means arranged to act on the central portion of said band and sheet during such feed, means acting posterior to said cutting means for progressively folding the portions of the sheet and band on each side of the line of cut into juxtaposition in opposite directions, a stationary sheet separating blade projecting between the sheets and across the line of said cut, and a pin carrying roller coacting with said sheets subsequent to said blade for producing isolated points of temporary juncture.

13. Apparatus for use in making bathing caps and the like comprising means for progressively applying ornaments to a traveling plastic band, means for progressively applying said band to a plastic sheet, with the ornaments facing said sheet, and feeding the composite sheet thus formed, pinch cutting means acting on said compound sheet along the central longitudinal line thereof, and means for progressively folding the portions of said sheet and band on each side of said line in opposite directions into juxtaposition to each other.

14. Apparatus for use in making bathing caps and similar articles comprising means for progressively applying a plastic band to a plastic sheet, means for continuously feeding said assembled band and sheet to and past a cutting station, a pinch cutter acting on said sheets at said station on the median line thereof, means for applying ornament strips to the plastic sheet on each side of the band in advance of said pinch cutter, and means posterior to said pinch cutter for folding the side portions of said sheet and band in opposite directions respectively into juxtaposition.

15. Apparatus for the purpose described comprising a platen roll, means for feeding a stock sheet to said roll, means for feeding a band to and positioning it centrally adjacent said stock sheet as it passes around said platen roll, a rotary pinch cutter arranged to act centrally on said sheet and band in conjunction with said platen roll, presser rolls arranged to bear on the margins of said body sheet beyond the edges of the band, and means for feeding ornament strips between said presser rolls and the exposed margins of the body sheet.

16. Apparatus for the purpose described comprising a platen roll, a rotary pinch cutter cooperating therewith, means for feeding a body sheet to said elements in web form, means for feeding a band into juxtaposition with the central portion of said body sheet, said body sheet feeding means including a driven roller and a floating idle roller around which said sheet passes, means whereby vertical movement of said floating roller varies the speed of the driven roller, and means acting posterior to said pinch cutter for folding the portions of the body sheet and band on opposite sides of the pinch cut in respectively opposite directions.

17. Apparatus for the purpose described comprising a platen roll, a rotary pinch cutter cooperating therewith, means for feeding a body sheet to said elements in web form, means for feeding a band into juxtaposition to said body sheet anterior to its passage between said platen roll and cutter, means for varying the feed of said body sheet, independent means for varying the feed of said band, and means acting anterior to said cutter for folding the portions of the band and sheet on opposite sides of the line of pinch cut in respectively opposite directions into juxtaposition.

18. Apparatus according to claim 17 in which the means for varying the feed of the body sheet comprises tension controlled feed means, and the means for feeding the band comprises means controlled by the weight of an accumulation of slack.

19. Apparatus for the purpose described comprising a platen roll, a rotary pinch cutter cooperating therewith, means for feeding a body sheet to said elements, means for feeding a band into juxtaposition to the central portion of said body sheet for conjoint action by said platen roll and cutter, tension operated means for regulating the feed of the body sheet, and means controlled by the weight of an accumulation of slack for regulating the feed of the band.

In testimony whereof, I affix my signature.

ARTHUR E. COLLINS.